(12) United States Patent
MacIntosh et al.

(10) Patent No.: US 6,973,481 B2
(45) Date of Patent: Dec. 6, 2005

(54) SYSTEM AND METHOD FOR CREATING AND MANAGING FORWARDING EMAIL ADDRESS

(75) Inventors: Paul MacIntosh, Woodstock, NH (US); Graham Dickson, Ottawa (CA)

(73) Assignee: Emailias LLC, Morris Plains, NJ (US)

( * ) Notice: Subject to any disclaimer, the term of this patent is extended or adjusted under 35 U.S.C. 154(b) by 694 days.

(21) Appl. No.: 09/815,266

(22) Filed: Mar. 23, 2001

(65) Prior Publication Data
US 2002/0138581 A1 Sep. 26, 2002

(51) Int. Cl.7 .............................................. G06F 13/00

(52) U.S. Cl. ...................... 709/206; 709/219; 709/223; 719/329

(58) Field of Search ................................ 709/206, 217, 709/219, 223, 225; 719/328, 329; 345/347

(56) References Cited

U.S. PATENT DOCUMENTS

| | | | | |
|---|---|---|---|---|
| 6,389,455 B1 * | 5/2002 | Fuisz | ........................ | 709/206 |
| 6,405,243 B1 * | 6/2002 | Nielsen | ..................... | 709/206 |
| 6,438,583 B1 * | 8/2002 | McDowell et al. | ......... | 709/206 |
| 6,651,217 B1 * | 11/2003 | Kennedy et al. | ............ | 715/507 |
| 2001/0026609 A1 * | 10/2001 | Weinstein et al. | ....... | 379/93.01 |
| 2002/0133403 A1 * | 9/2002 | Bissell et al. | ................. | 705/14 |

OTHER PUBLICATIONS

Expireit at http://www.expireit.com, printed May 21, 2002.
MailExpire at http://www.mailexpire.com, printed May 21, 2002.
MailShell at http://www.mailshell.com, printed May 21, 2002.
Sneakemail at http://www.sneakemail.com, printed May 21, 2002.
SpamGourmet at http://www.spamgourmet.com, printed May 21, 2002.
SpamHole at http://www.spamhole.com, printed May 21, 2002.
SpamMotel at http://www.spammotel.com, printed May 21, 2002.
Spamex at http://www.spammex.com, printed May 21, 2002.

* cited by examiner

Primary Examiner—Viet D. Vu
(74) Attorney, Agent, or Firm—Katten Muchin Rosenman LLP

(57) ABSTRACT

A system and method of creating an email forwarding address during an Internet session where a user is viewing a web page that includes a prompt for an email address includes creating and storing an email forwarding address for the user that is automatically associated with the web page. The email forwarding address re-directs email addressed thereto to a target email address associated with the user. The email forwarding address is sent to the user to enable the user to use the email forwarding address to satisfy the email address prompt.

41 Claims, 12 Drawing Sheets

SYSTEM AND METHOD FOR CREATING AND MANAGING FORWARDING EMAIL ADDRESS

FIELD OF THE INVENTION

The present invention relates generally to electronic mail and in particular to a system and method for controlling the delivery of electronic mail over a communications network.

BACKGROUND OF THE INVENTION

Electronic mail ("email") has been and continues to be an important and powerful tool by which to communicate information. Sending an email has cost, speed, and convenience advantages over sending its paper-based counterpart. Sending an email is analogous to sending a paper-based letter. When a computer user wishes to send an email using a graphical user interface (GUI) based email client application, the email client application is conditioned to open a form by selecting an appropriate icon. The email address of the recipient of the email is entered into the form together with the message to be conveyed to the recipient. Once the email is complete, an icon is selected on the form resulting in the email being sent to the recipient. Once sent, the email is delivered to an inbox associated with the recipient. The recipient can access his/her ("his") inbox and read the email through his email client application.

A sent email typically includes the email address of the sender. This of course makes it easy for the recipient of an email to respond to the email. Unfortunately, including the email address of the sender also creates a greater potential for exposing the sender's email address to an entity who will use the email address to forward unsolicited email ("spam") to the sender.

The process whereby a computer user acquires an email address and shares the email address with others can be likened to growing a tree. The base of the tree is created whenever a new email address is obtained. Each time the user's email address is given to another, a new branch is grown from the base of the tree. Metaphorically, when a user sends an email to an email address, that user represents the tip of a branch with the sent email travelling down the branch to the email inbox at the base of the tree.

Although computer users tend to keep email addresses, situations arise where it is desired or necessary to change an email address. For example, a user may change his Internet Service Provider (ISP) or employer or may wish to avoid spam that is being directed to his existing email address. Typically, when a user changes his email address, the old email address is canceled and a new email address is obtained. Once the old email address has been canceled, the user is no longer able to receive email directed to the old email address and must notify others of his new email address if the user wishes to continue receiving email from them. Using the tree metaphor, changing an email address can be likened to chopping down an existing tree and growing a new tree. Unfortunately, the process of changing an email address is onerous, time-consuming and frustrating. Often, not all users are advised of the email address change and as a result, the user cannot receive email from those users. Also, changing an email address to avoid spam typically does little to avoid spam from being received at the new email address. As a result, even if an email address is changed spam problems tend to continue.

Rather than canceling an existing email address and obtaining a new email address, it is possible to use a forwarding email address so that email delivered to an old email address is automatically forwarded to a new email address. Unfortunately, this solution is typically unavailable to users who change ISPs or employers. Also, the use of a forwarding email address does not avoid spam since spam directed to the old email address is forwarded to the new email address like every other email.

Email services are available, which allow users to create recipient or "to" (i.e. forwarding) email addresses (hereinafter referred to as Generation-to ("Gen-2") email services"). The forwarding email addresses created by each user are managed within an account associated with that user that is hosted by the Gen-2 email service. Each user can access his account through an interface allowing the user to control and manage many email forwarding addresses. Emails directed to the forwarding email addresses created by a user are automatically forwarded to the user's primary email address. In this manner, a user is able to assign a unique forwarding email address to each email contact (person or company) that the user wishes to receive email from. The user's primary email address therefore can be kept confidential thereby reducing the risk of spam. This modifies the above-described tree analogy such that each branch of the tree becomes a unique forwarding email address that forwards received email down its branch to the user's primary email address at the base of the tree. If the user changes his primary email address, the user's account profile simply needs to be updated to reflect the user's new primary email address so that the forwarding email addresses in the user's account direct email to the user's new primary email address. Metaphorically, instead of cutting down the user's email tree, the user effectively transplants the email tree.

Gen-2 email services in addition to facilitating changes to primary email addresses also have a profound effect on spam. If a user receives spam that is directed to one of his forwarding email addresses and the user wishes to stop the spam, then just that one forwarding email address needs to be terminated and removed from the account. Metaphorically, this is analogous to trimming one branch from the tree. As will be appreciated, this provides a user with a significantly better solution to dealing with spam, since email addressed to the user's other forwarding email addresses is still delivered to the user's primary email address.

When replying to an email, most email client applications insert the email address of the sender in a "from" field in the email form. This of course contradicts the confidentiality aspect of using forwarding email addresses. To solve this problem, Gen-2 email services use "reply-masking" when directing reply emails back to the sender on behalf of the recipient so that the reply appears to be coming from the forwarding email address rather than the recipient's primary email address. In particular, when an email arrives at the mail server of the Gen-2 email service, but before the email is forwarded to the primary email address, the Gen-2 email service creates a temporary email address to be used as the "reply" address for the email and places a record in an internal system database. The record typically includes three pieces of information, namely the created temporary email address, the primary email address of the sender, and the email address of the recipient.

When the email recipient replies to an email, the email is directed to the temporary email address created by the Gen-2 email service. The Gen-2 email service then uses the temporary email address to locate the associated record and uses the record to change the reply email. Specifically, the temporary email address is replaced with the email address of the original sender, and the primary email address of the recipient who is replying to the email is replaced with the forwarding email address that is known by the original sender. By performing these steps, the user's primary email address is masked and is not delivered to others when replies to received emails are sent.

Although this process works to maintain the confidentiality of a user's primary email address, problems with this method of implementation result in a number of drawbacks and limitations. In particular, the Gen-2 email service must create and store a temporary email address and a record for each individual email message so that the recipient's primary email address can be kept confidential should the recipient elect to reply. Thus, this solution places a disk space burden on the Gen-2 email service especially when the volume of email traffic is high. An additional notable limitation associated with this reply-masking process is that an email reply remains possible for only as long as the temporary email address and record exist in the database. Any deliberate or accidental deletion of records from the database makes it impossible for email recipients to reply to senders. As a result, this solution requires that the temporary email address and record created for each individual email be permanently stored by the Gen-2 email service. Further to the resource issue discussed above, the permanent storage of this data raises privacy concerns.

In addition to the above-described problems associated with reply-masking, current reply-masking techniques include a "back door", which can be exploited and allow a third party to generate fraudulent email. Specifically, if a third party obtains or guesses a temporary email address that is created by a Gen-2 email service, the third party is able to use their own email address to send an email to that temporary email address. This allows the third party to impersonate an unsuspecting user of the Gen-2 email service and send fraudulent emails, since the Gen-2 email service does not validate the email address of the sender.

Although Gen-2 email services allow a user to determine sources of email, since each email contact is assigned a unique forwarding email address to which email originating from the email contact is to be sent, in order to be effective, users must be diligent and provide each new email contact with a unique forwarding email address. This makes Gen-2 email services onerous and thereby reduces their effectiveness.

Various procedures for creating new forwarding email addresses have been considered by Gen-2 email services. For example, when a user is visiting a website that has requested his email address and the user wishes to provide that website with a forwarding email address, the user must visit the website of his Gen-2 email service and log into the Gen-2 email service to access his account. Once logged in, the user is required to enter an identifier that will help the user later associate the new forwarding email address with the website to which the forwarding email address is being provided. The Gen-2 email service then creates the new forwarding email address and displays the forwarding email address. The user is able to copy the forwarding email address to the website being visited.

In some implementations, the user must invoke a separate program or "plug-in" that the user has downloaded from the Gen-2 email service when the user wishes to log into the Gen-2 email service. In the simplest case, the program is executed by clicking on a shortcut link associated with the program that has been created manually on the desktop or on a system taskbar. One implementation automatically remembers the user name and password, yet still requires the user to confirm the user name and then confirm the password on a second browser window prior to accessing the Gen-2 email service functionality. Regardless of the manner by which users log into these Gen-2 email services, a user must confirm his login name and password and must manually enter a meaningful identifier before a forwarding email address is created. As will be appreciated, the user is therefore required to perform multiple steps through multiple browser windows. This not only makes the process of creating forwarding email addresses time-consuming and onerous but also distracts the user's focus from the website that the user is visiting.

There have been a few attempts to streamline the forwarding email address creation process. For example, one Gen-2 email service has created a downloadable application that can be installed on and executed by the operating system resident on a client computer system. While this downloadable application opens a smaller window in which the above-described steps are performed thereby obviating the need for a user to open another browser client window, this implementation still suffers from many of the disadvantages discussed above. Also, the installed application runs on only one type of operating system. Additionally, accessing the Gen-2 email service website from a client computer system other than the user's original client computer system requires that the application be downloaded and installed onto the client computer system being used.

Another Gen-2 email service has created a partner program between the Gen-2 email service and other partner websites. These partner websites include hyperlinks to the website of the Gen-2 email service. In this way, users can visit the website of the Gen-2 email service by clicking on the hyperlinks displayed on the partner websites. Although this facilitates access to the Gen-2 email service website, this implementation still suffers from the numerous disadvantages, steps and inconveniences discussed above. As will be appreciated, improvements in the manner by which forwarding email addresses are created and managed are desired.

Accordingly, it is therefore an object of the present invention to provide a novel system and method for controlling the delivery of electronic mail over a communications network.

SUMMARY OF THE INVENTION

According to one aspect of the present invention there is provided during an Internet session where a user is viewing a web page that includes a prompt for an email address, a method of creating and forwarding an email forwarding address to said user comprising the steps of:

creating and storing an email forwarding address for the user that is automatically associated with said web page, said email forwarding address re-directing email addressed thereto to a target email address associated with said user; and sending said email forwarding address to said user to enable said user to use said email forwarding address to satisfy the email address prompt.

During such an Internet session, the request is made by the user on-line. The request is examined to determine the user making the request and the web page that includes the email address prompt. Preferably, the request includes an identifier assigned to the user, and the web page address of the web page. The request may also include the title of the web page.

The request may be generated by the user by activating a control on the toolbar of a web client application, by activating a web control on the web page or in response to selection of a menu choice of a web client application.

In one embodiment when the email forwarding address is sent to the user, the email forwarding address is displayed in a second browsing window separate from the browsing window in which the web page is displayed. The displayed email forwarding address may be dragged or copied from the second browsing window into the browsing window in which the web page is displayed.

According to another aspect of the present invention there is provided a system for creating and forwarding email forwarding addresses to users comprising:

a web server communicating with client computer systems over Internet connections, said web server receiving requests from said client computer systems generated by users of said client computer systems who during Internet sessions view web pages that include prompts for email addresses; and a database server creating and storing email forwarding addresses for the users that are automatically associated with said web pages in response to requests received by said web server, said email forwarding addresses re-directing email addressed thereto to target email addresses associated with said users, said database server conveying created email forwarding addresses to said web server, said web server sending said email forwarding addresses to said users to enable said users to use said email forwarding addresses to satisfy the email address prompts.

According to another aspect of the present invention there is provided a method of forwarding a received email addressed to an email forwarding address to an associated target email address comprising the steps of:

upon receipt of an email from a sender, determining the target email address associated with the email forwarding address of said email;

composing a forwarding email that is addressed to said target email address and that includes a reply address, said reply address including information identifying the email forwarding address and validation data; and sending the forwarding email to said target email address.

Preferably, the information identifying the email forwarding address includes an identifier representing the storage location of the email forwarding address. The validation data is preferably a code computed using the identifier and the sender's email address. It is also preferred that the information is encoded.

The forwarding email may further include at least one selectable web control that can be selected to disable the email forwarding address. A record is stored when the at least one selectable web control is selected to associate disablement of the email forwarding address with the sender.

Upon receipt of a reply email generated in response to the forwarding email, the email address of the replier is validated. The encoded reply address is decoded to determine the email forwarding address and the email address of the sender. The validation code is then examined to authenticate the validity of the encoded reply address. The reply email is then reply-masked so that the reply email is addressed to the email address of the sender and includes a reply address identifying the email forwarding address before the reply email is sent.

In one embodiment email received from the sender that is directed to an invalid email forwarding address is discarded. A status message is sent however, to the sender indicating that the email was accepted for delivery. Email received from the sender that is directed to a deleted email forwarding address is also discarded. In this case a status message is sent to the sender indicating that the email was not accepted for delivery.

According to yet another aspect of the present invention there is provided a system for forwarding received email addressed to email forwarding addresses to associated target email addresses comprising:

a mail server receiving email directed to said email forwarding addresses;

a database server in communication with said mail server, said database server determining the target email addresses associated with email forwarding addresses identified in email received by said mail server and conveying said target email addresses to said mail server, wherein said mail server in response to received target email addresses composes and sends forwarding email addressed to said target email addresses, each forwarding email including a reply address, said reply address including information identifying the email forwarding address and validation data.

According to still yet another aspect of the present invention there is provided a system for forwarding a received email addressed to an email forwarding address to an associated target email address comprising:

means for determining the target email address associated with the email forwarding address of said email upon receipt of an email from a sender;

means for composing a forwarding email that is addressed to said target email address and that includes an encoded reply address, said encoded reply address including information identifying the email forwarding address and validation data; and means for sending the forwarding email to said target email address.

According to still yet another aspect of the present invention there is provided in an email system, a method of handling received email message directed to invalid email addresses comprising the steps of:

disregarding received email directed to invalid email addresses; and returning status messages to senders indicating that the emails were accepted for delivery.

According to still yet another aspect of the present invention there is provided a method of monitoring spam comprising the steps of:

assigning email forwarding addresses to users to enable users to convey email forwarding address to email contacts so that emails sent to users by said email contacts are directed to said email forwarding addresses;

forwarding emails directed to the email forwarding addresses to the users associated therewith; and maintaining a record of email forwarding addresses that have been cancelled by users due to receipt of unsolicited email directed to said email forwarding addresses.

Preferably, the record identifies web page addresses associated with email contacts to which cancelled email forwarding addresses were conveyed. It is also preferred that each forwarding email includes a control that can be selected to generate a delete email forwarding address request.

The present invention provides advantages in that forwarding email addresses can be created quickly and easily by users as compared to the prior art while requiring only a primary email address from users. The primary email address only needs to be entered once. Once entered, the primary email address is stored for subsequent rapid selection. Users can create an email forwarding address whenever an email address is requested simply by clicking on a web control. The present invention also provides an improved reply-encoding and reply-masking technique that does not require permanent storage of temporary email address records and significantly reduces the suceseptibility to identity impersonations suffered by prior art solutions. The present invention also provides advantages in that a record of email forwarding addresses cancelled by users due to receipt of unsolicited email is maintained. This allows statistical information identifying websites that are the cause of spam to be developed.

BRIEF DESCRIPTION OF THE DRAWINGS

Embodiments of the present invention will now be described more fully with reference to the accompanying drawings, in which like reference numerals denote like parts in the several views, and in which.

DETAILED DESCRIPTION OF THE PREFERRED EMBODIMENT

Figure 1:
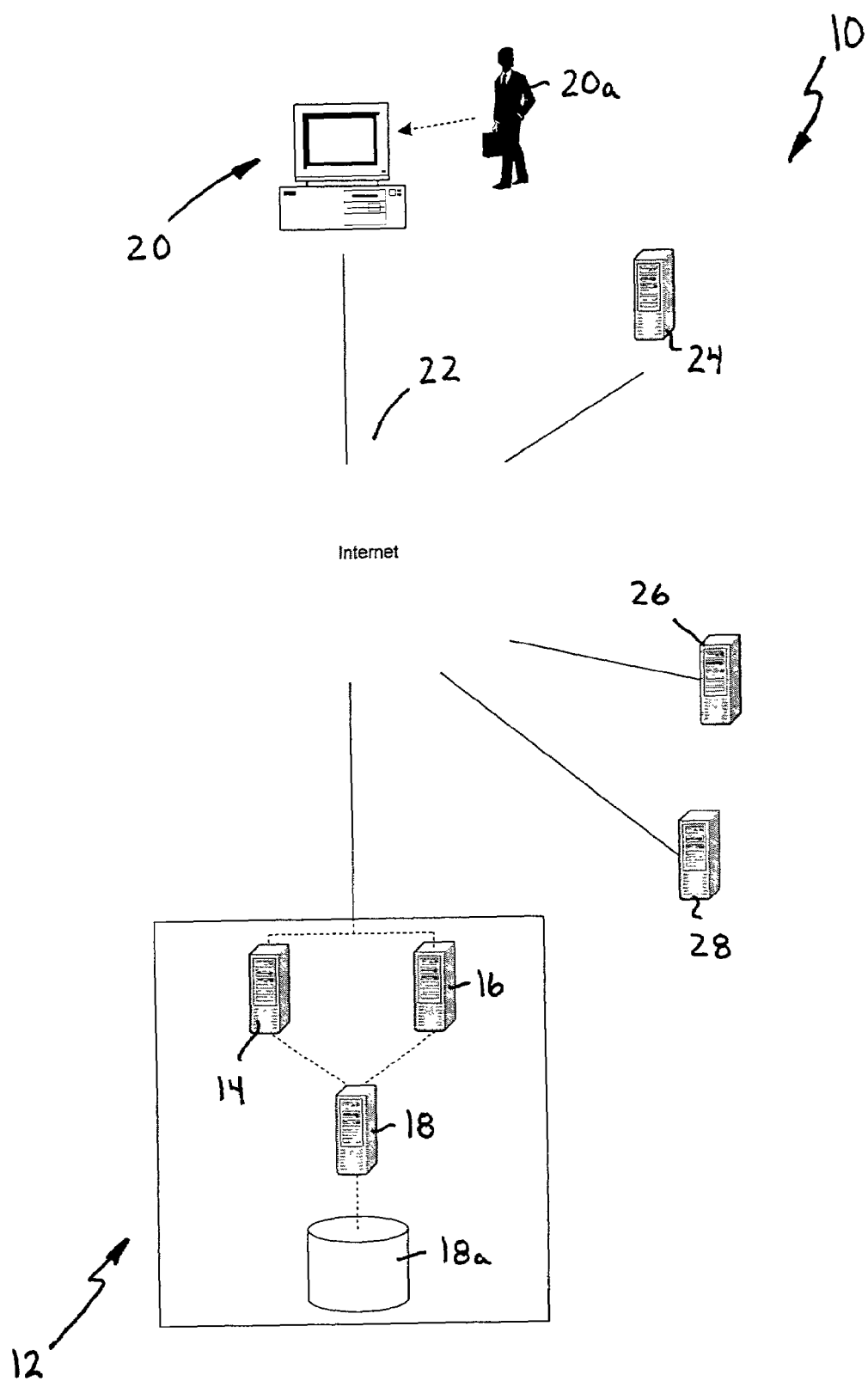
FIG. 1 is a schematic diagram of a distributed wide area network including a system for creating and managing forwarding email addresses in accordance with the present invention.
Figure 2:
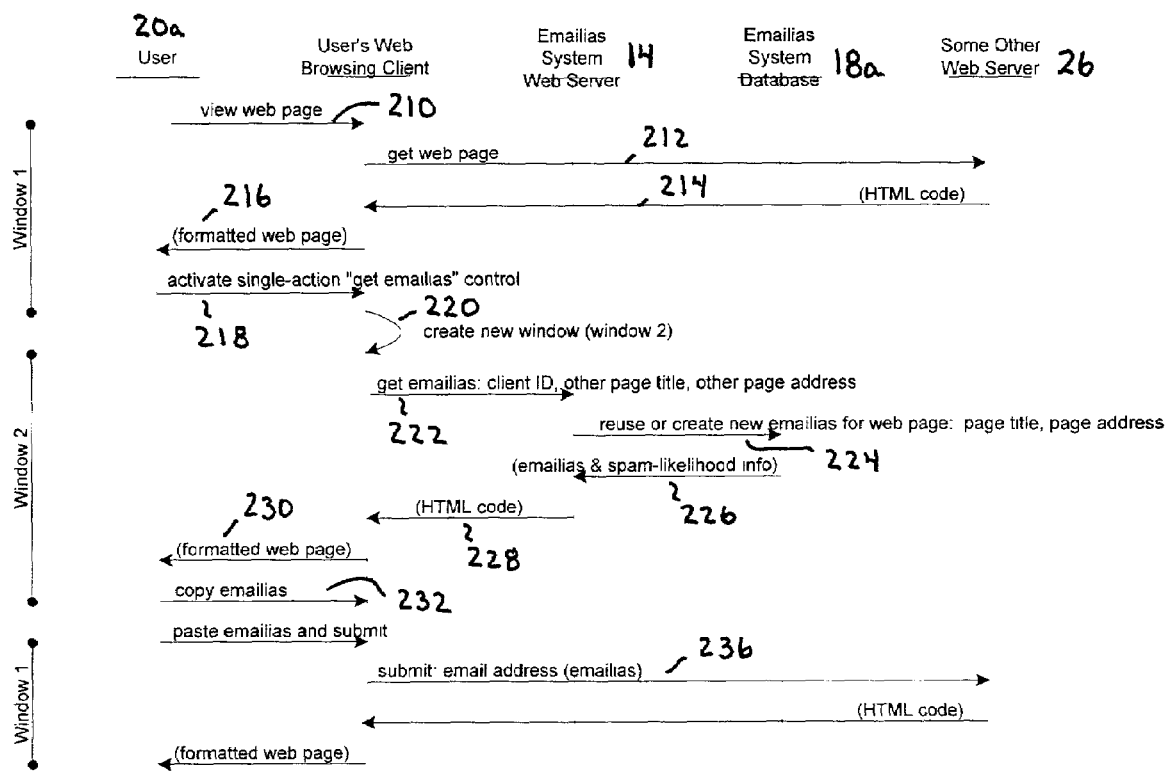
FIG. 2 is an event trace diagram showing the steps involved during creation of an email forwarding address.

Turning now to FIG. 1, a distributed wide area network (WAN) is shown and is generally identified by reference numeral 10. A system 12 for allowing users to create and manage forwarding email addresses and that collects information associating spam with websites is included in the WAN 10. The system 12 includes a web server 14, a mail server 16 and a database server 18. The database server 18 manages a system database 18a, which is accessed by the web server 14 and the mail server 16.

The web server 14 communicates with a client computer system 20 executing a web client application in the form of a web browser over a communications network such as the Internet 22. As is well known, the Internet 22 provides a backbone of high-speed data communication lines between host computers that route data and messages, including emails, using the Transmission Control Protocol/Internet Protocol (TCP/IP) suite of protocols. During communications between the web server 14 and the client computer system 20, the web server 14 sends web page source files including Hypertext Markup Language (HTML) code to the client computer system 20 in response to requests generated by the web browser. The HTML code received by the client computer system 20 causes the web browser to display formatted web pages to the user 20a of the client computer system. This enables the user 20a to access and interact with the system 12 through a web-based graphical user interface (GUI). Although only one client computer system 20 is shown, those of skill in the art will appreciate that this is for ease of illustration only and that the system 12 in fact communicates with a plurality of client computer systems 20.

The client computer system 20 also executes an email client application and communicates with an associated mail server 24 that is set up to handle the user's personal email account. Therefore, emails sent to the user's personal email address are delivered to the user's inbox hosted by the mail server 24. Through the email client application, the user 20a of the client computer system 20 can access his email account so that emails can be read and sent by the user. In the embodiment illustrated in FIG. 1, the client computer system 20 and mail sever 24 are located at different geographical locations and communicate over the Internet 22. Those of skill in the art will appreciate that the client computer system 20 and the mail server 24 may be located at the same geographical location and be part of the same client computer system.

Other web servers 26 and mail servers 28 form part of the distributed wide area network and also communicate with the system 12, the client computer system 20 and the mail server 24 over the Internet 22.

A user who does not wish to provide an email contact (person or business) with a personal email address can use the system 12 to create an email forwarding address or "email alias". In the present embodiment, a user wishing to use the system 12 to create an email forwarding address must be registered. During the registration process, the user establishes an Internet session with the web server 14 through the web browser executed by the client computer system 20 and submits profile information including a login name, a password and a target email address. Once the profile information is submitted, the system 12 creates an account for the user in the database 18a and stores the submitted target email address in the user's account. After the user's account has been created, the user is able to create an email forwarding address associated with the target email address. The system 12 redirects email that is addressed to the email forwarding address, to the user's target email address.

During the registration or login process, the system 12 also sends a client identifier or "cookie" to the client computer system 20 that associates the user with the user's account in the database 18a. The client identifier is retained by the web browser and is used by the web browser to establish a persistent account session with the web server 14 to facilitate subsequent communications with the web server 14. This enables the user to visit other web pages while maintaining a "logged-in status" with the web server 14. The client identifier accompanies each request made to the web server 14 by the web browser thereby enabling an automatic user-contextual view of the requested web page. The user is also able to create an email forwarding address request web control in the toolbar of the web browser. Once created, a user can direct the web browser to generate an email forwarding address request automatically by activating the email forwarding address request web control. In the present embodiment, the web control is created by dragging a link or http call into the links section of the web browser. This process is equivilent to bookmarking a link to a website. As a result, the web control is not limited to the client computer system 20 or its operating system and does not require the use of plug-ins.

The system 12 creates an email forwarding address in response to an email forwarding address request received from a registered user. An email forwarding address request is typically generated by a user, who is presented with a web page requesting an email address that is displayed in an Internet browsing window, but who does not wish to submit a personal email address. The system 12 can generate three different types of email forwarding addresses, namely "standard" email forwarding addresses, one-time-use or "friend" email forwarding addresses and email forwarding address pairs. Standard email forwarding addresses are typically created when a web page requests a user's personal email address. Friend email forwarding addresses are typically created when a web page requests the personal email address of an email recipient (i.e. a friend or associate of the user). Email forwarding address pairs include a standard email forwarding address and a friend email forwarding address and are typically created when a web page requests the personal email address of a friend or associate of the user as well as the user's personal email address. An email forwarding address request generated by the web browser in response to activation of the email forwarding address request web control, by default prompts the system 12 to create a standard email forwarding address. Of course if desired, the system 12 can be set up to allow separate email forwarding address request web controls to be created in the toolbar of the web browser for each type of email forwarding address.

When a standard email forwarding address is created by the system 12 in response to activation of the email forwarding address request web control, the created email forwarding address is presented to the user in a second Internet browsing window separate from the Internet browsing window displaying the web page that caused the user to request creation of the email forwarding address. The window includes web controls and selectable menu items that allow the user to customize the type and the properties of the email forwarding address. The displayed email forwarding address can be copied or dragged from the second Internet browsing window into the first Internet browsing window and submitted instead of the user's personal email address.

Each email forwarding address created by the system 12 is automatically associated with a target email address of the user who created the email forwarding address and with the web page address (URL) of the web page that caused the user to request its creation. Email sent to an email forwarding address is delivered to the system 12. The system 12 in turn modifies and re-directs the email so that the email is sent to the user's target email address. The email received by the user is reply-encoded in a manner that allows the system 12 to reply-mask and authenticate any replies made by the user. The manner by which the system 12 modifies an email to reply-encode and to reply-mask it, is efficient and does not place resource constraints on the system 12.

Further specifics of the system 12 will now be described with particular reference to FIGS. 1 to 13.

Email Forwarding Address Creation

Assuming that the user has established an Internet session with the web server 14, when the user is visiting another website and the web browser displays a web page in response to HTML code received from a web server 26 that requests the user to enter and submit an email address (see steps 210 to 216 in FIG. 2), if the user wishes to submit an email forwarding address instead of a personal email address, the user activates the email forwarding address request web control on the web browser toolbar (step 218). In response, the web browser loads a second Internet browsing window (or re-loads the second window if it already exists as a result of a previous email forwarding address request) (step 220). The web browser then sends a request to the web server 14 for an email forwarding address (step 222). The email forwarding address request includes the web page address (URL) of the web page that caused the user to make the email forwarding address request, the title of that same web page, and the client identifier. The web server 14 in response to the email forwarding address request, sends a request to the database server 18 for an email forwarding address (step 224).

Upon receiving the email forwarding address request, the database server 18 uses the client identifier to perform a query of the database 18*a* and determine if an email forwarding address already exists in the user's account that is associated with the web page address (URL) included in the email forwarding address request. If such an email forwarding address does not exist in the database 18*a*, the database server 18 creates a new standard email forwarding address that is automatically associated with the web page address (URL) and assigns properties to the email forwarding address. The email forwarding address properties include an automatically generated label or nickname, a default folder in which the email forwarding address is stored within the user's account, a default target email address, a default auto-expiration condition, default auto-filters and the web page address (URL) that caused the user to make the email forwarding address request. The database server 18 then stores the email forwarding address with its properties in the database 18*a* within the default folder of the user's account. Following this, the database server 18 returns the email forwarding address together with its properties to the web server 14 (step 226).

If such an email forwarding address already exists in the database 18*a*, the database server 18 returns the existing email forwarding address and its properties to the web server 14.

Once the web server 14 has received the email forwarding address together with its properties, the web server 14 sends HTML code to the client computer system 20 (step 228) that causes the web browser to display a web page in the second Internet browsing window presenting the email forwarding address (step 230).

With the email forwarding address and its properties displayed in the second Internet browsing window, the user can copy or drag the email forwarding address into the appropriate field of the web page requesting the email address (step 232) and condition the web browser to submit the email forwarding address to the web server 26 rather than providing his personal email address (steps 234 and 236). As a result, email generated by the web server 26 or by an associated mail server 28 in response to the submitted email forwarding address, is directed to the mail server 16 and not to the user's personal email address. In this manner, the user's personal email address is maintained confidential.

Figure 3A:
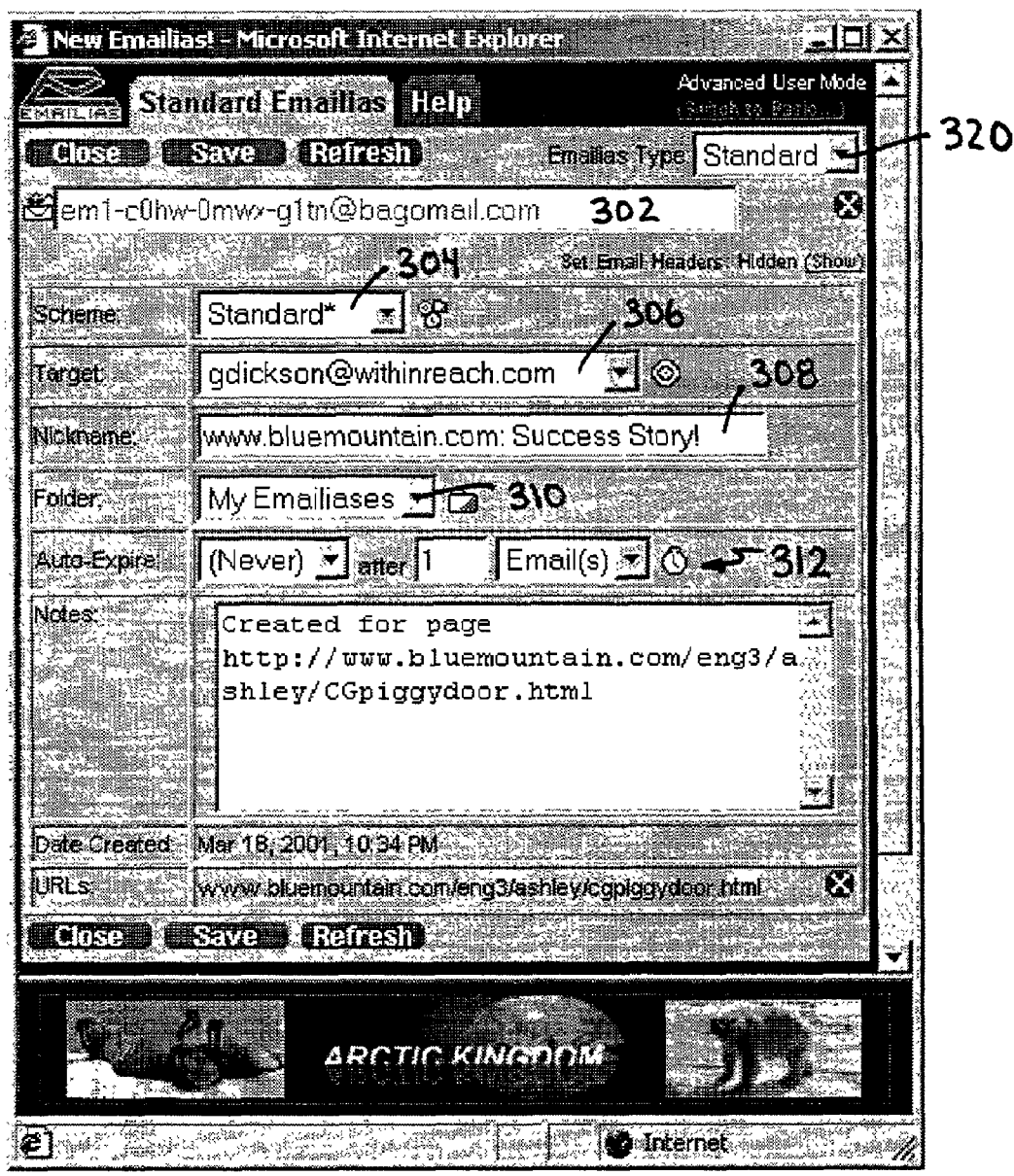
FIGS. 3a to 3c are web pages presented to a user showing a standard email forwarding address, a split email forwarding address pair and a friend email forwarding address.

FIG. 3a shows the web page 300 presented in the second Internet browsing window that displays the standard email forwarding address and its properties. As can be seen, the web page includes a text field 302 that presents the email forwarding address created by the system 12. The web page 300 also includes a target multi-item menu 306 identifying the default target email address that is assigned to the email forwarding address. The default target email address can be changed using the menu and save tools provided other target email addresses exist in the user's account. The web page 300 also includes a text field 308 holding the nickname assigned to the email forwarding address. A folder multi-item menu 310 identifies the default folder in which the email forwarding address is stored within the user's account. The default folder can be changed using the menu and save tools provided another folder exists in the user's account. A multi-item menu 312 provided on the web page 300 displays the auto-expiration criteria assigned to the email forwarding address. For example, the auto-expiration criteria determines the duration the email forwarding address remains enabled. The duration may be a function of the number of times the email forwarding address is used, an elapsed amount of time following creation of the email forwarding address or a specified date on which the email forwarding address is to be disabled. The auto-expiration criteria can be changed by the user using the menu and save tools.

Although not shown, the web page 300 also includes an auto-filter multi-item menu that allows the user to enable or disable email filters. The target email address, default folder, auto-expiration condition and auto-filter settings can be changed by the user through selection of a "preset setting" choice from a multi-item menu 304. The multi-item menu 304 includes a list of preset setting choices that can be customized or added by the user for use and convenience. A URL field is also provided on the web page 300 and holds the web page address (URL) that caused the user to generate the email forwarding address request. In addition, the web page 300 includes a multi-item menu 320 to convert between standard email forwarding addresses, friend email forwarding addresses and email forwarding address pairs.

Figure 3B:
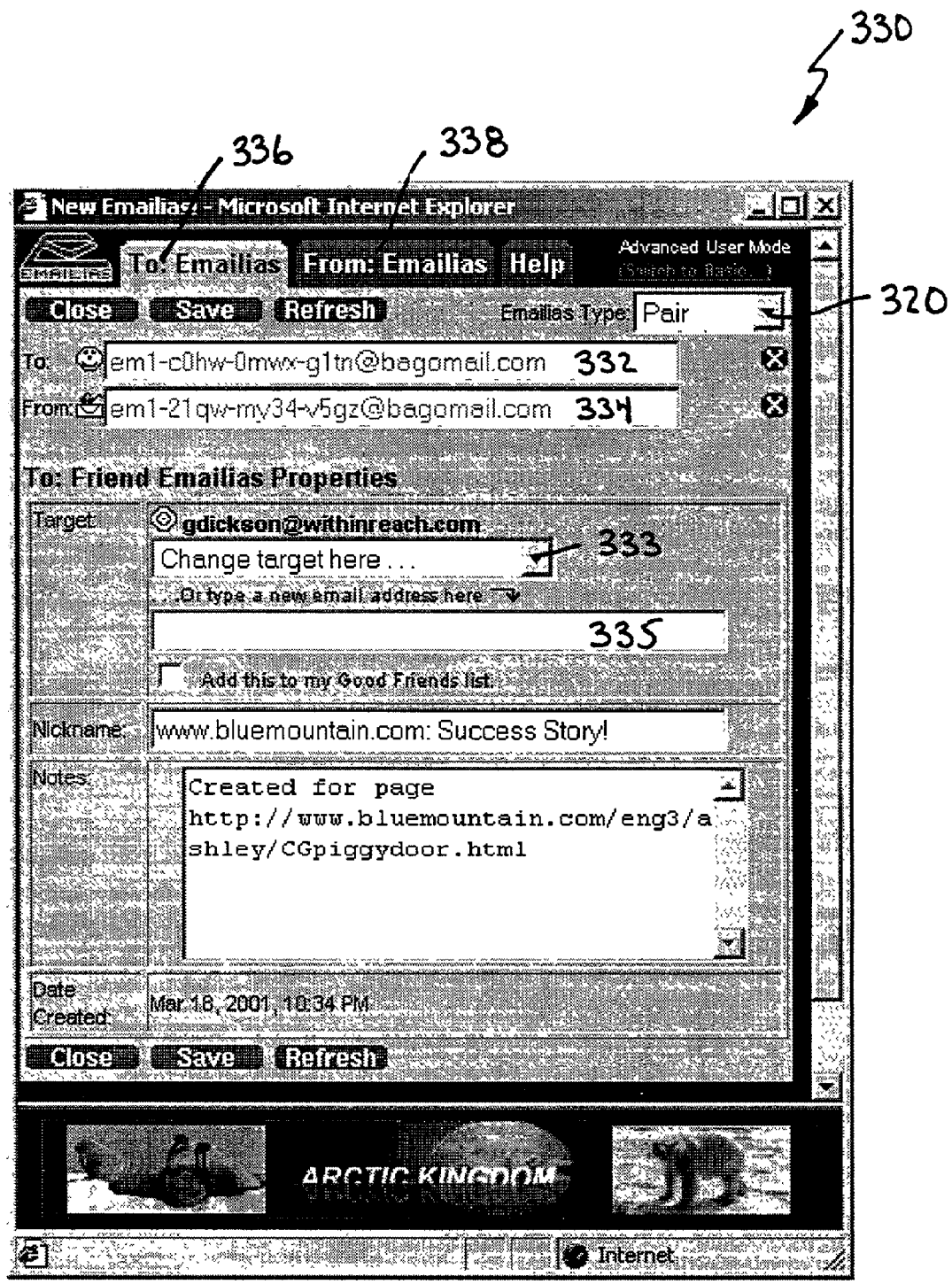

FIG. 3b shows a web page 330 displaying an email forwarding address pair. As can be seen, the email forwarding address pair includes a friend email forwarding address and a standard email forwarding address conveniently displayed on the web page 330. The web page 330 includes a text field 332 that displays an email forwarding address created for another email recipient and a text field 334 that displays an email forwarding address created for the user. A multi-item menu 333 allows the target email address displayed in text field 332 to be changed. The target email address can be changed using the menu and save tools. An additional field 335 is provided to permit the target email address to be manually entered into the web page 330. This new email address may, at the user's option, be added permanently to the user's personal list of contacts, which can be selected from the multi-item menu 333. The properties associated with each email forwarding address are presented on the web page 330 in response to selection of the appropriate tab 336 or 338. An email forwarding address pair is particularly useful when the user is presented with a web page such as a greeting card web page that requests the email address of a recipient as well as the email address of the sender.

Figure 3C:
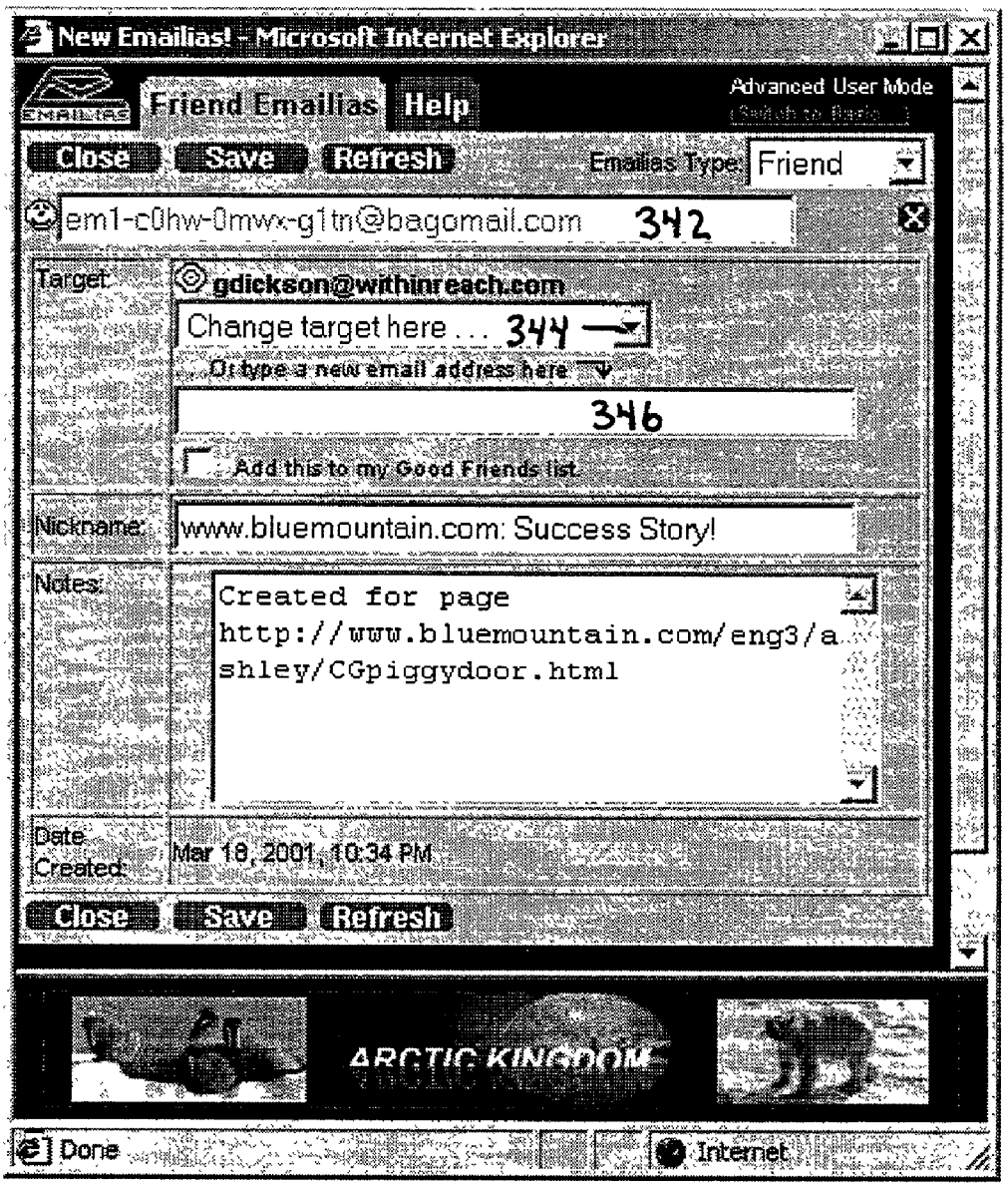

FIG. 3c shows a web page 340 displaying a friend email forwarding address. Friend email forwarding addresses are useful when a user is providing the address of another email recipient. This type of email forwarding address is a one-time-use email forwarding address. As can be seen, the web page 340 includes a text field 342 displaying the email forwarding address created for the email recipient. A multi-item menu 344 allows the target email address displayed in text field 342 to be changed. The target email address can be changed using the menu and save tools. An additional field 346 is provided to permit the target email address to be manually entered into the web page 340. This new email address may, at the user's option, be added permanently to the user's personal list of contacts, which can be selected from the multi-item menu 344.

Email Forwarding Address Handling

Figure 4:
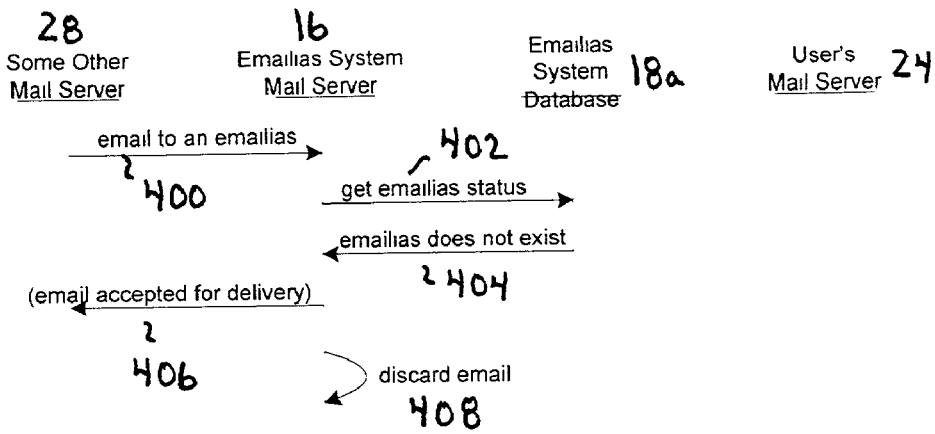
FIG. 4 is an event trace diagram showing the steps involved during handling of an email directed to a non-existent email forwarding address.

When a mail server 28 sends an email directed to an email forwarding address, the email is delivered to the mail server 16 (see step 400 in FIG. 4). Upon receipt of the email, the mail server 16 queries the database server 18 to determine the status of the email forwarding address (i.e. whether or not the email forwarding address exists in the database 18a) (step 402). If the email forwarding address does not exist in the database 18a, the database server 18 returns a status message to the mail server 16 indicating that the email forwarding address does not exist (step 404). The mail server 16 in turn returns a status message to the mail server 28 indicating that the email was accepted for delivery (step 406). This "false positive" reporting is done to inhibit nefarious users from being able to distinguish between email sent to valid and invalid email forwarding addresses. The mail server 16 subsequently discards the email since the email forwarding address does not exist (step 408).

Figure 5:
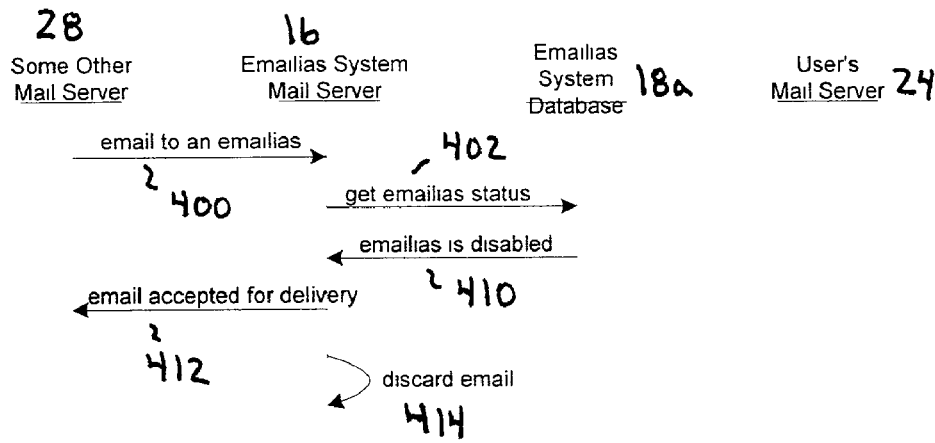
FIG. 5 is an event trace diagram showing the steps involved during handling of an email directed to a disabled email forwarding address.

If the email forwarding address exists but is currently disabled (i.e. the email forwarding address does not forward emails that it receives), the database server 18 returns a status message to the mail server 16 indicating that the email forwarding address has been disabled (see step 410 in FIG. 5). The mail server 16 in turn returns a status message to the mail server 28 indicating that the email was accepted for delivery (step 412). The mail server 16 subsequently discards the email since the email forwarding address is disabled (step 414).

Figure 6:
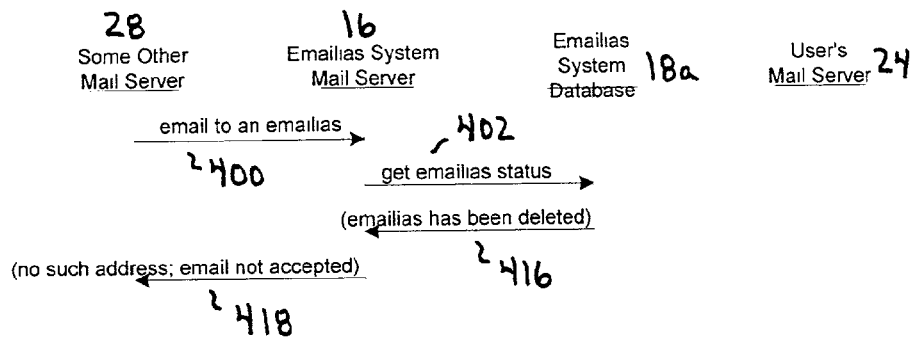
FIG. 6 is an event trace diagram showing the steps involved during handling of an email directed to a deleted email forwarding address.

If the email forwarding address previously existed, but prior to receipt of the email has been deleted (i.e. the user does not want to receive any more emails directed to that email forwarding address), the database server 18 returns a status message to the mail server 16 indicating that the email forwarding address has been deleted (see step 416 in FIG. 6). The mail server 16 returns the email as undeliverable (step 418). This is done to reduce the amount of incoming email traffic received by the mail server 16 that is directed to old email forwarding addresses that have been deleted by users.

Figure 7:
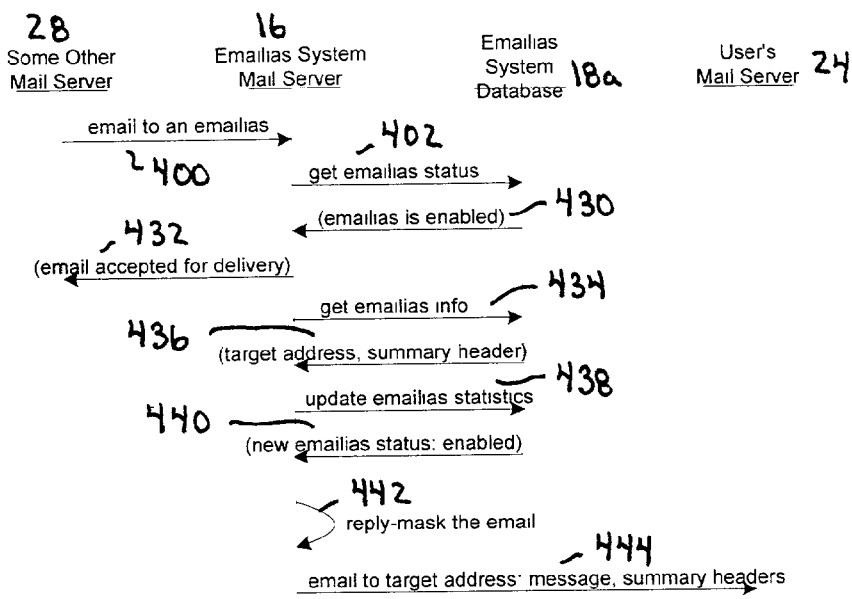
FIG. 7 is an event trace diagram showing the steps involved during handling of an email directed to an enabled email forwarding address.

If the email forwarding address exists in the database 18a and is enabled, the database server 18 returns a status message to the mail server 16 indicating that the email forwarding address is valid and enabled (see step 430 in FIG. 7). The mail server 16 in turn returns a status message to the mail server 28 indicating that the email was accepted for delivery (step 432). The mail server 16 then directs the database server 18 to retrieve the target email address from the database 18a that is associated with the email forwarding address (step 434) as will be described. The database server 18 in turn retrieves this information from the database 18a and returns the information to the mail server 16 (step 436). The mail server 16 then directs the database server 18 to determine whether the email forwarding address meets the auto-expiration criteria specified by the user (step 438). In response, the database server 18 returns the email forwarding address status to the mail server 16 (i.e. whether the email forwarding address is still active) (step 440). The mail server 16 then performs reply-encoding to create an encoded reply address to replace the original sender's email address in the email being forwarded to the user (step 442).

Once the reply-encoding has been performed, the email is composed and is addressed to the target email address retrieved from the database 18*a*. The email is then sent by the mail server 16 so that it arrives in the user's inbox at the mail server 24 like any other normal email (step 444).

Figure 8:
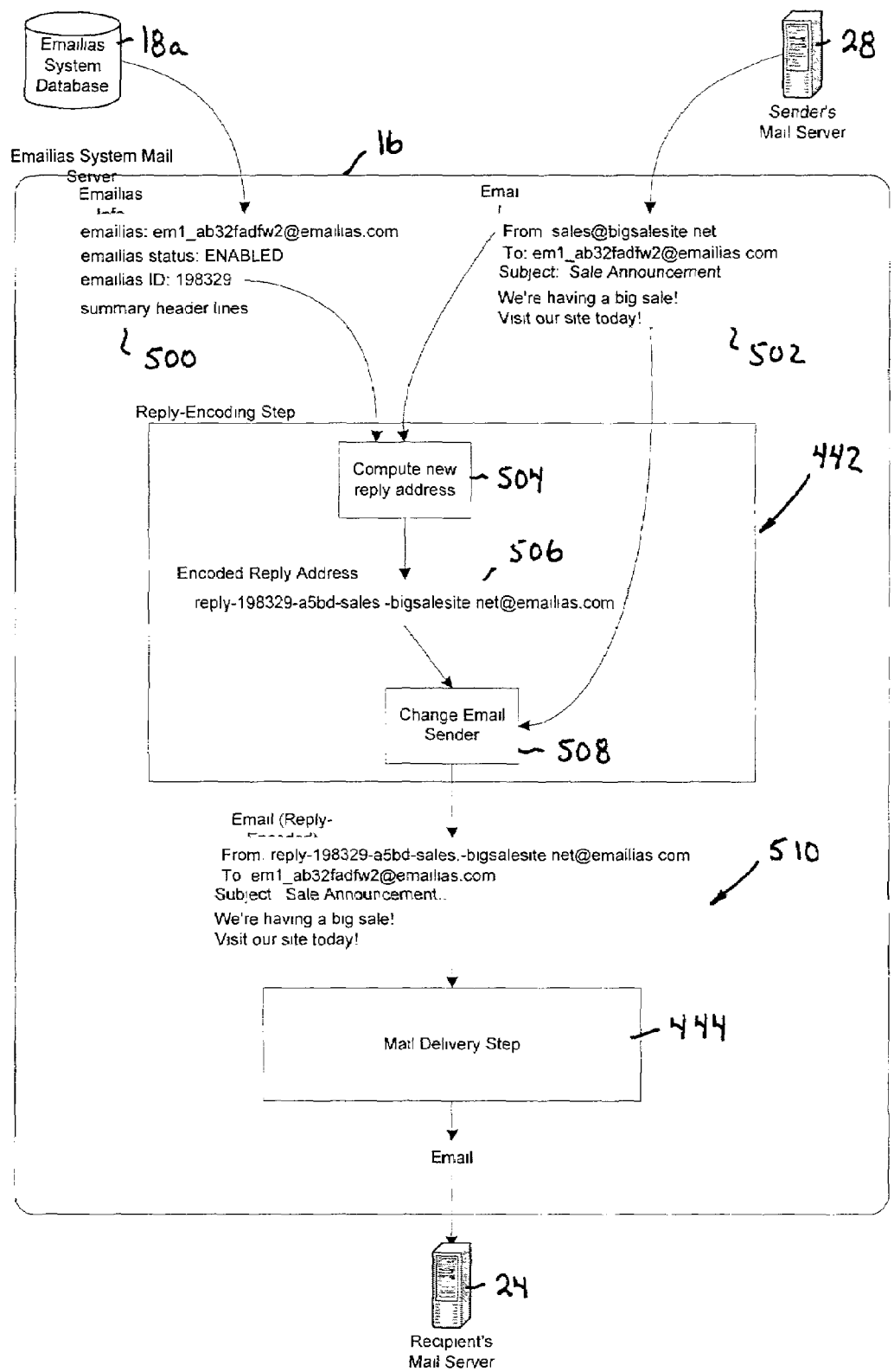
FIGS. 8 and 9 are schematic block diagrams showing the steps performed by the system of FIG. 1 during reply-encoding and forwarding of an email to a user's inbox.
Figure 9:
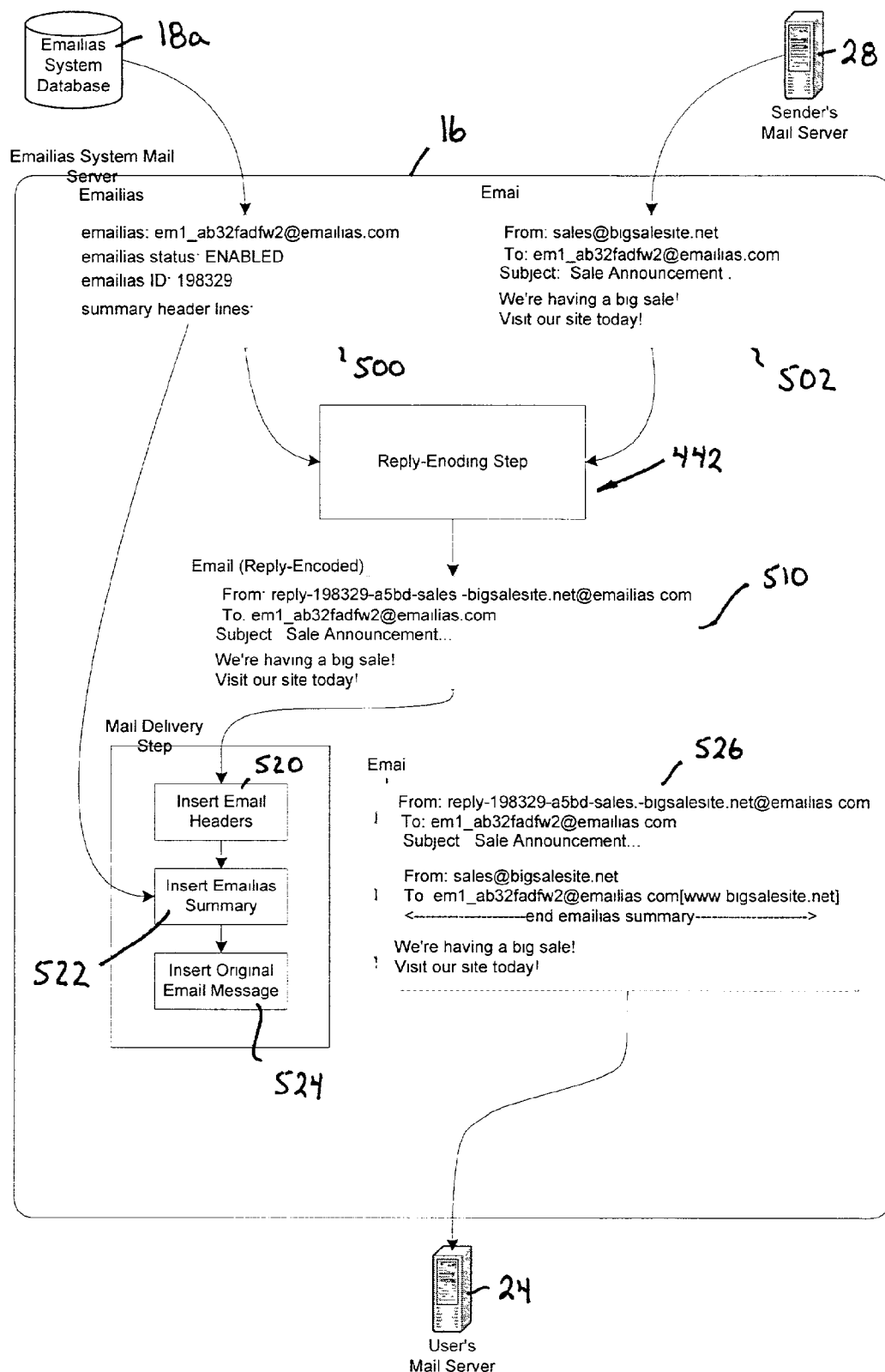

Turning now to FIGS. 8 and 9, the reply-encoding process of step 442 and the email composition and delivery process of step 444 are better illustrated. During the reply-encoding process of step 442, the mail server 16 uses the email forwarding address (block 500) and the sender's email address (block 502). Specifically, the mail server 16 computes an encoded reply address using a fixed email address format by joining an identifier representing the email forwarding address, the sender's email address and validation data in the form of a code for anti-fraud/positive validation to guard against identity impersonation (blocks 504 and 506). The sender's email address of the received email is replaced by the encoded reply address (blocks 508 and 510).

In the present embodiment, the encoded reply address takes the form "reply-identifier-validation code-sender". The identifier is a number representing the address of the target email address stored in the database 18*a*. The validation code is computed using the identifier and the sender's email address.

During the composition and delivery process of step 444, the received email including the encoded reply address is further modified to include appropriate email headers (block 520), an email forwarding address summary (block 522) and the original email message (block 524). At this point, the email (block 526) is delivered to the mail server 24 (block 526).

In the present embodiment, the email headers include the encoded reply address instead of the sender's email address, the target email address and a subject line. The email forwarding address summary includes the sender's email address, the email forwarding address to which the sender's original email was directed and controls to allow the user to view the email forwarding address properties, delete the email forwarding address etc. If the email is an HTML email, the controls are in the form of selectable buttons. If the email is text, the controls are in the form of URLs.

Figure 10:
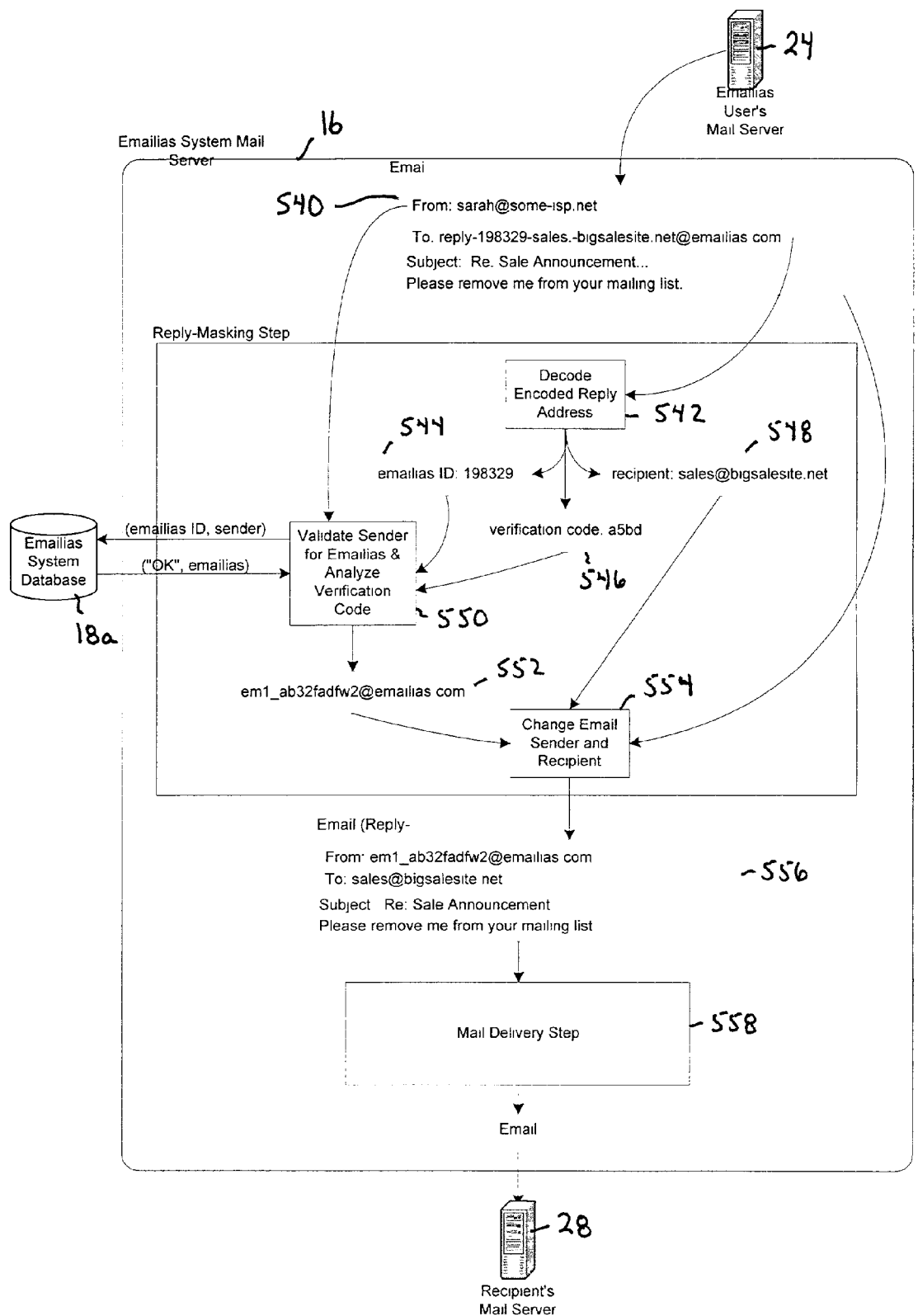
FIG. 10 is a schematic block diagram showing the reply-masking steps performed by the system of FIG. 1 upon receipt of a reply email including an encoded reply address.
Figure 11:
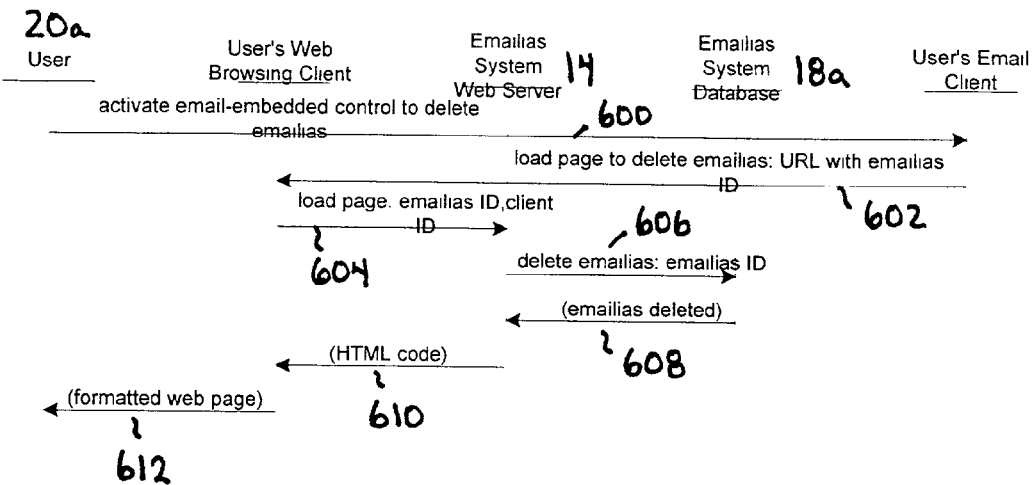
FIG. 11 is an event trace diagram showing the steps involved during deletion of an email forwarding address using a non-spam related web control added to an email forwarded to the user by the system of FIG. 1.
Figure 12:
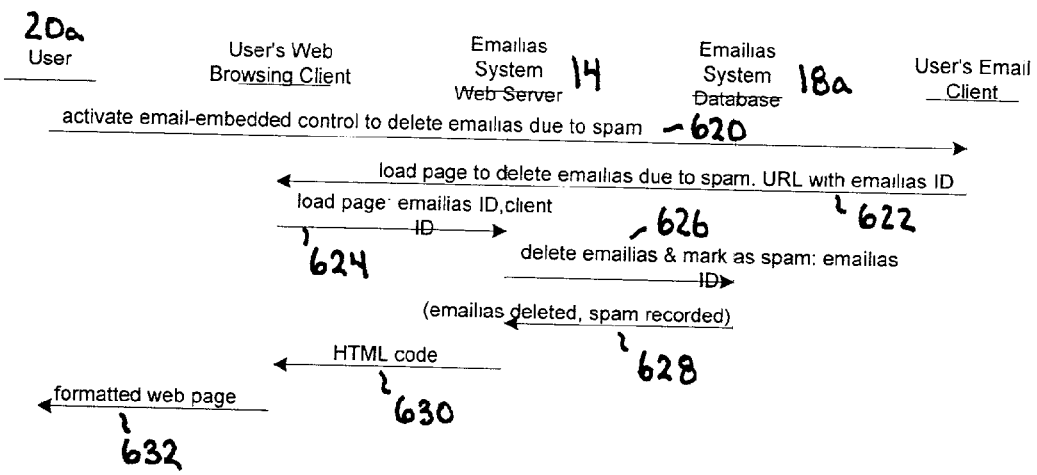
FIG. 12 is an event trace diagram showing the steps involved during deletion of an email forwarding address using a spam related web control added to the email forwarded to the user by the system of FIG. 1.
Figure 13:
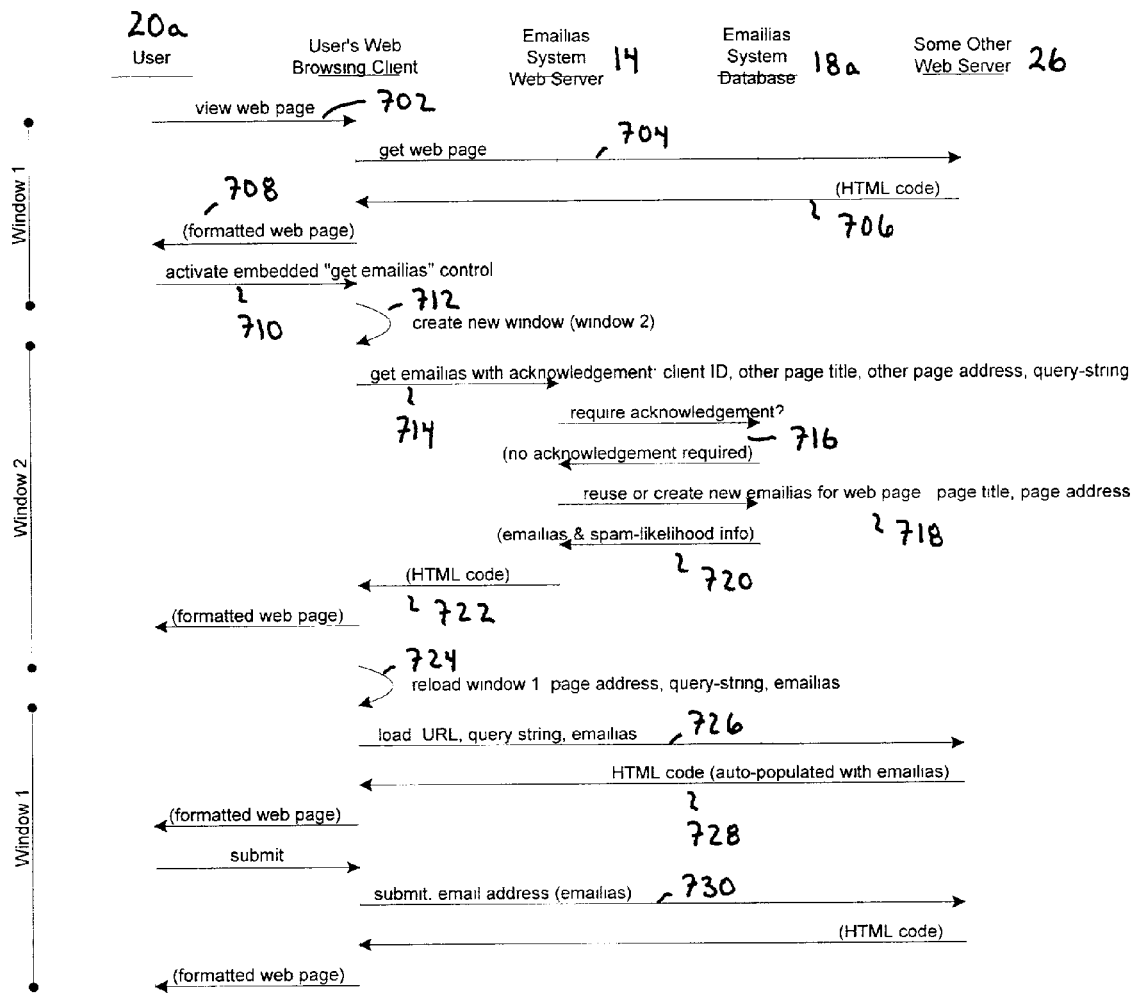
FIG. 13 is an event trace diagram showing alternative steps involved during creation of an email forwarding address by the system of FIG. 1.

When the user sends a reply email, the reply email is addressed to the encoded reply address and therefore, is sent by the user's mail server 24 to the mail server 16 (see block 540 in FIG. 10). Upon receipt of the reply email, the mail server 16 extracts the replier's email address (i.e. the target email address) from the email and then decodes the encoded reply address to extract the identifier, validation code and the sender's original email address (blocks 542 to 548). The extracted identifier and target email address are conveyed to the database server 18, which uses the identifier to compare the extracted target email address with the target email address stored in the database 18*a* at the address represented by the identifier. The validation code is also conveyed to the database server 18 for verification. If the extracted target email address and the validation code are valid and authentic, the target email address is examined to determine if the replier is authorized to have reply-masking performed on reply email (block 550). If authorized, the mail server 16 performs "reply-masking" on the reply email. During this process, the reply email is altered to change the email address of the replier to the email forwarding address (block 552), and to change the recipient address to the original sender's email address (block 554). The resulting email (block 556) is then ready to be delivered and is sent to the mail server 28 by the mail server 16 (block 558).

Email forwarded to a target email address by the mail server 16 may include two embedded email forwarding address delete web controls. One web control is associated with email forwarding addresses that are being deleted due to spam. If after receiving a forwarded email, the user wishes to delete the associated email forwarding address for a purpose other than spam (see FIG. 11), the user through the email client application must display the email. Once displayed, the user activates the non-spam related delete email forwarding address web control that is embedded in the email (step 600). In response, the email client application directs the web browser to send a request to the web server 14 to delete the email forwarding address (step 602). The web browser in turn sends the request to the web server 14, which includes the web address, the email forwarding address, and the client identifier (step 604). Upon receipt of the request, the web server 14 directs the database server 18 to delete the email forwarding address from the user's account within the database 18*a* (step 606). The database server 18 then notifies the web server 14 that the email forwarding address has been deleted from the user's account (step 608). The web server 14 in turn sends HTML code to the client computer system 20 (step 610) that causes the web browser to display a web page advising the user that the email forwarding address has been deleted from the user's account (step 612).

If the user wishes to delete the associated email forwarding address due to spam (see FIG. 12), the user activates the spam related delete email forwarding address web control that is embedded in the email (step 620). In response, the email client application directs the web browser to send a request to the web server 14 to delete the email forwarding address (step 622). The web browser in turn sends the request to the web server 14, which includes the web address, the email forwarding address, and the client identifier (step 624). Upon receipt of the request, the web server 14 directs the database server 18 to delete the email forwarding address from the user's account within the database 18*a*. An entry is then recorded in a database table that associates the web address with the receipt of spam. Entries of this nature are collected on an on-going basis and thus, as email forwarding addresses are deleted due to spam, statistical information identifying websites that are the cause of spam can be developed (step 626). The database server 18 then notifies the web server 14 that the email forwarding address has been deleted from the user's account (step 628). The web server 14 in turn sends HTML code to the client computer system 20 (step 630) that causes the web browser to display a web page advising the user that the email forwarding address has been deleted from the user's account (step 612).

Email forwarding addresses deleted from users' accounts regardless of the reason for deletion are archived by the system 12.

The system web-based GUI allows each registered user to access his account so that the profiles associated with email forwarding addresses created by the user can be modified. During access web pages are presented to the user. These web pages allow the user to change the target email address for a specific email forwarding address, a user selected group of email forwarding addresses or all email forwarding addresses created by the user. The user may also change the target email address that is used by the system as the default target email address whenever the user creates a new email forwarding address. The web pages also allow the user to create, modify and/or delete folders in which email forwarding addresses are stored. In this manner, email forwarding addresses can be organized in any manner deemed convenient to the user. The web pages also allow the user to assign, modify or delete the auto-expiration criteria and auto-filters for the email forwarding addresses.

Preset setting web pages are also available, which allow the user to create and customize groups of settings in a convenient manner so that the groups of settings may be applied to email forwarding addresses quickly and easily via the multi-item menu 304 discussed previously. This of course avoids the need for a user to select settings for an email forwarding address individually.

As will be appreciated, the system 12 allows users to register quickly and easily while requiring minimal personal information from the users. In fact in the preferred embodiment, only a user's target email address is required. Once registered, users can create email forwarding addresses quickly and easily whenever an email address is requested simply by clicking a web control created in the web browser. Emails sent to an email forwarding address are processed and forwarded quickly and efficiently by the system to maintain email address confidentiality. When a user responds to a forwarded email, since the reply-masking is based on reply address encoding, dealing with replies to reply-encoded email can be handled easily by the system 12 without putting a strain on system resources. Also, since the system 12 collects information that associates websites with spam, valuable statistical information identifying websites as the cause of spam can be developed.

The preferred embodiment discusses use of a web control that has been created in the web browser toolbar to generate the email forwarding address request. However, those of skill in the art will appreciate that alternative methods of requesting an email forwarding address are available. For example, partner entities may have web page integrated controls in their websites that are linked to the web server 14. In this case, when a user is viewing a web page that includes a prompt for an email address and such a web page integrated control (see steps 702 to 708 in FIG. 13), the user can activate the web page integrated control to generate the email forwarding address request (step 710). In response, the web browser loads a second window (or re-loads the second window if it already exists from a previous email forwarding address request) (step 712). The web browser then sends a request to web server 14 for an email forwarding address (step 714). The email forwarding address request includes the web page address (URL) of the web page, the title of that same web page, the client identifier and a "query string" of textual data to be passed to the Internet browsing window displaying the web page that prompted the email forwarding address request when the web page is reloaded.

Upon receipt of the request from the web browser, the web server 14 instructs the database server 18 to determine whether the user has authorized automatic fulfillment of an email forwarding address request generated by activation of the web page integrated control or whether the user should be prompted for confirmation (step 716). If automatic fulfillment is authorized or if the user confirms in response to a prompt, the database server 18 uses the client identifier to perform a query of the database 18*a* to determine if an email forwarding address exists in the user's account that is associated with the web page address (URL) (step 718). If an email forwarding address already exists in the database 18*a*, the database server 18 returns the existing email forwarding address to the web server 14 (step 720).

If such an email forwarding address does not exist in the database 18*a*, the database server 18 creates a new email forwarding address that is associated with that web page. The database server 18 then stores the newly created email forwarding address in the database 18*a* within the user's account and returns the email forwarding address to the web server 14 (step 720).

Once the web server 14 has received the email forwarding address from the database server 18, the web server sends HTML code to the client computer system 20 that includes the original web page address, the query string, and the email forwarding address (step 722). In response to the HTML code, the web browser reloads the first window (step 724 and sends a request to the web server 26 for the web page (step 726). The request includes the query string and the email forwarding address encoded therein. The web server 26 in turn sends HTML code to the client computer system 20 that causes the web browser to display the web page (step 728). In this case however, the web page includes the original web page (and any additional updated values) as well as the email forwarding address populated in the appropriate field. After the user has completed any other actions that are required, the web browser can submit the results to the web server 26 (step 730). As a result, email generated by the web server 26 or by an associated mail server 28 that is sent to the email forwarding address is directed to the mail server 16 and not to the user's personal email address. In this manner, the user's personal email address can be maintained confidential.

In addition to the above-described methods of generating an email forwarding address request, a menu choice may also be included in the web browser that is exposed by opening a drop down menu. In this case, the web browser includes code to request an email forwarding address and to copy the resulting email forwarding address into the text field of the menu choice automatically without having to reload the web page.

Although preferred embodiments of the present invention have been described, those of skill in the art will appreciate that modifications and variations may be made without departing from the spirit and scope thereof as defined by the appended claims.

What is claimed is:

1. During an Internet session where a user is viewing a web page that includes a prompt for an email address, a method of creating and forwarding an email forwarding address to said user comprising the steps of:
   creating and storing a unique email forwarding address for the user that is automatically associated with said web page, said email forwarding address being dedicated for use by an entity associated with said web page to enable said entity to send email messages to said user, email messages directed to said email forwarding address being re-directed to a target email address associated with said user; and
   sending said email forwarding address to said user to enable said user to use said email forwarding address to satisfy the email address prompt.

2. The method of claim 1 wherein creating and storing of said unique email forwarding address is performed in response to a request made by said user on-line, said method further comprising the step of examining the request to determine the user making the request and the web page that includes the email address prompt.

3. The method of claim 2 wherein said request includes an identifier assigned to said user and the web page address of said web page.

4. The method of claim 3 wherein said request further includes the title of said web page.

5. The method of claim 2 wherein said request is generated by activating a control on the toolbar of a web client application.

6. The method of claim 2 wherein said request is generated by activating a web control on said web page.

7. The method of claim 2 wherein said request is generated in response to selection of a menu choice of a web client application.

8. The method of claim 2 wherein during said sending step, said email forwarding address is displayed to said user in a second browsing window separate from a browsing window in which said web page is displayed.

9. The method of claim 8 wherein said email forwarding address can be dragged or copied from said second browsing window into the browsing window in which said web page is displayed.

10. The method of claim 2 wherein unique email forwarding addresses created for said user and web page addresses associated with said email forwarding addresses are stored in a user account, during said examining step, the web page address of said request being compared with the web page addresses in said user account, if said web page address exists in said account, bypassing the creating and storing step and sending the email forwarding address associated with the web page address to said user.

11. A system for creating and forwarding email forwarding addresses comprising:
  a web server communicating with client computer systems over Internet connections, said web server receiving requests from said client computer systems generated by users of said client computer systems who during Internet sessions view web pages that include prompts for email addresses; and
  a database server creating and storing unique email forwarding addresses for the users that are automatically associated with said web pages in response to requests received by said web server, said email forwarding addresses being dedicated for use by entities associated with said web pages to enable said entities to send email messages to said users, email messages directed to said email forwarding addresses being re-directed to target email addresses associated with said users, said database server conveying created email forwarding addresses to said web server, said web server sending said email forwarding addresses to said users to enable said users to use said email forwarding addresses to satisfy the email address prompts.

12. The system of claim 11 wherein each request includes an identifier assigned to the user generating said request, and the web page address of the web page being viewed by said user, said database server using said identifier to associate the email forwarding address with said target email address.

13. The system of claim 12 wherein said database server stores the email forwarding addresses created for each user and web page addresses associated with said email forwarding addresses in an account associated with said user, said database server comparing the web page address in each request received from a user with the web page addresses in the account of said user, if said web page address exists in said account, said database server bypassing the creating and storing of said email forwarding address and sending the email forwarding address associated with the web page address that exists in said account to said web server.

14. The method of claim 1 wherein said unique email forwarding address is of a type dependent on the nature of the email address prompt.

15. The method of claim 14 wherein said unique email forwarding address is of a standard type or a one-time use type.

16. The method of claim 15 wherein said standard type unique email forwarding address is created when the email address prompt requests the email address of said user and wherein the one-time use type unique email forwarding address is created when the email address prompt requests the email address of an entity other than said user.

17. The method of claim 15 wherein said unique email forwarding address may also be of an address pair type, said address pair type unique email forwarding address being created when the email address prompt requests the email address of said user as well as the email address of an entity other than said user.

18. During an Internet session where a user is viewing a web page via a first browser window that includes a prompt for an email address, a method of creating and forwarding an email forwarding address to said user comprising the steps of:
  creating and storing a unique email forwarding address for the user that is automatically associated with said web page, email messages directed to said email forwarding address being re-directed to a target email address associated with said user; and
  sending said email forwarding address to said user and displaying said email forwarding address in a second browser window different from that displaying said web page to enable said user to use said email forwarding address to satisfy the email address prompt, said email forwarding address being draggable from said second browser window into the first browser window.

19. The method of claim 18 wherein creating and storing of said unique email forwarding address is performed in response to a request made by said user on-line, said method further comprising the step of examining the request to determine the user making the request and the web page that includes the email address prompt.

20. The method of claim 19 wherein said request includes an identifier assigned to said user and the web page address of said web page.

21. The method of claim 20 wherein said request further includes the title of said web page.

22. The method of claim 19 wherein said request is generated by activating a control on the toolbar of a web client application.

23. The method of claim 19 wherein said request is generated by activating a web control on said web page.

24. The method of claim 19 wherein said request is generated in response to selection of a menu choice of a web client application.

25. The method of claim 19 wherein unique email forwarding addresses created for said user and web page addresses associated with said unique email forwarding addresses are stored in a user account, during said examining step, the web page address of said request being compared with the web page addresses in said user account, if said web page address exists in said account, bypassing the creating and storing step and sending the email forwarding address associated with the web page address to said user.

26. The method of claim 18 wherein said unique email forwarding address is of a type dependent on the nature of the email address prompt.

27. The method of claim 26 wherein said unique email forwarding address is of a standard type or a one-time use type.

28. The method of claim 27 wherein said standard type unique email forwarding address is created when the email address prompt requests the email address of said user and wherein the one-time use type unique email forwarding address is created when the email address prompt requests the email address of an entity other than said user.

29. The method of claim 28 wherein said unique email forwarding address may also be of an address pair type, said address pair type unique email forwarding address being created when the email address prompt requests the email address of said user as well as the email address of an entity other than said user.

30. During an information exchange session wherein a web page that includes a prompt for an email address is being viewed, a method of creating and forwarding an email forwarding address for a user comprising the steps of:
creating a unique email forwarding address for the user that is automatically associated with said web page, said email forwarding address being dedicated for use by an entity associated with said web page to enable said entity to send email messages to said user, email messages directed to said email forwarding address being re-directed to a target email address associated with said user; and
using said email forwarding address to satisfy the email address prompt.

31. The method of claim 30 wherein said unique email forwarding address is created in response to an on-line request, said method further comprising the step of examining the request to determine the user and the web page that includes the email address prompt.

32. The method of claim 31 wherein said request includes an identifier assigned to said user and the web page address of said web page.

33. The method of claim 32 wherein said request further includes the title of said web page.

34. The method of claim 31 wherein said request is generated by activating a control on the toolbar of a web client application.

35. The method of claim 31 wherein said request is generated by activating a web control on said web page.

36. The method of claim 31 wherein said request is generated in response to selection of a menu choice of a web client application.

37. The method of claim 31 wherein unique email forwarding addresses created for said user and web page addresses associated with said email forwarding addresses are stored in a user account, during said examining step, the web page address of said request being compared with the web page addresses in said user account, if said web page address exists in said account, bypassing the creating and storing step and sending the email forwarding address associated with the web page address to said user.

38. The method of claim 18 wherein said unique email forwarding address is of a type dependent on the nature of the email address prompt.

39. The method of claim 38 wherein said unique email forwarding address is of a standard type or a one-time use type.

40. The method of claim 39 wherein said standard type unique email forwarding address is created when the email address prompt requests the email address of said user and wherein the one-time use type unique email forwarding address is created when the email address prompt requests the email address of an entity other than said user.

41. The method of claim 40 wherein said unique email forwarding address may also be of an address pair type, said address pair type unique email forwarding address being created when the email address prompt requests the email address of said user as well as the email address of an entity other than said user.

* * * * *